US010713811B2

(12) United States Patent
Siu et al.

(10) Patent No.: US 10,713,811 B2
(45) Date of Patent: *Jul. 14, 2020

(54) SECURITY CAMERA SYSTEM WITH MULTI-DIRECTIONAL MOUNT AND METHOD OF OPERATION

(71) Applicant: Sensormatic Electronics, LLC, Boca Raton, FL (US)

(72) Inventors: Patrick Siu, Tyngsborough, MA (US); Christopher Cianciolo, Westford, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/818,821

(22) Filed: Nov. 21, 2017

(65) Prior Publication Data

US 2019/0102903 A1  Apr. 4, 2019

Related U.S. Application Data

(60) Provisional application No. 62/566,114, filed on Sep. 29, 2017.

(51) Int. Cl.
*G06T 7/70* (2017.01)
*H04N 5/225* (2006.01)
(Continued)

(52) U.S. Cl.
CPC .......... *G06T 7/70* (2017.01); *G08B 13/19632* (2013.01); *H04N 5/2252* (2013.01);
(Continued)

(58) Field of Classification Search
CPC .... G06T 7/70; G08B 13/19632; H04N 7/181; H04N 5/2253; H04N 5/2252; H04N 5/2254; H04W 84/18
See application file for complete search history.

(56) References Cited

U.S. PATENT DOCUMENTS 5,818,519 A   10/1998  Wren
5,878,151 A    3/1999  Tang et al.
(Continued)

FOREIGN PATENT DOCUMENTS

DE   10 2006 004731    8/2007
EP       1 594 322    11/2005
(Continued)

OTHER PUBLICATIONS

Afshari etal. "The PANOPTIC Camera: A Plenoptic Sensor with Real-Time Omnidirectional Capability" J. Sign Process Syst. (2013) 70:305-328 (Year: 2013).*

(Continued)

*Primary Examiner* — Richard A Hansell, Jr.
(74) *Attorney, Agent, or Firm* — HoustonHogle LLP

(57) ABSTRACT

A security camera system includes a base unit and sensor modules for generating image data. The base unit includes several mounting sockets arranged at different elevational and azimuthal directions around the base unit, and the sensor modules attach, for example, magnetically, to the mounting sockets. The security camera system is capable of automatic detection of the location of the sensor modules, as the identification information for the mounting sockets to which the sensor modules are attached are identified by image analytics. A reference image depicting the security camera system or an area surrounding the security camera system is analyzed and the positions of the sensor modules are determined based on the reference image. In the latter example, the reference image includes markers designating points of reference visible to the sensor modules and is compared to image data generated by the sensor modules.

22 Claims, 10 Drawing Sheets

(51) Int. Cl.
*G08B 13/196* (2006.01)
*H04N 7/18* (2006.01)
*H04N 17/00* (2006.01)
*H04W 84/18* (2009.01)

(52) U.S. Cl.
CPC ......... *H04N 5/2253* (2013.01); *H04N 5/2254* (2013.01); *H04N 5/2257* (2013.01); *H04N 7/181* (2013.01); *H04N 17/002* (2013.01); *H04W 84/18* (2013.01)

(56) References Cited

U.S. PATENT DOCUMENTS

| | | | |
|---|---|---|---|
| 6,002,995 | A | 12/1999 | Suzuki et al. |
| 6,476,856 | B1 | 11/2002 | Zantos |
| 6,799,047 | B1 | 9/2004 | Bahl et al. |
| 6,839,560 | B1 | 1/2005 | Bahl et al. |
| 6,898,432 | B1 | 5/2005 | Jiang |
| 6,947,059 | B2 | 9/2005 | Pierce et al. |
| 7,680,192 | B2 | 3/2010 | Kaplinsky |
| 7,903,871 | B2 | 3/2011 | Kaplinsky et al. |
| 9,438,782 | B2 | 9/2016 | Donaldson |
| 9,690,172 | B2 | 6/2017 | Donaldson |
| 9,911,454 | B2 * | 3/2018 | van Hoff .................. G11B 19/20 |
| 10,057,487 | B1 * | 8/2018 | Chen ....................... G03B 17/02 |
| 2001/0024233 | A1 | 9/2001 | Urisaka et al. |
| 2001/0056574 | A1 | 12/2001 | Richards |
| 2002/0095486 | A1 | 7/2002 | Bahl |
| 2003/0118015 | A1 | 6/2003 | Gunnarsson et al. |
| 2004/0152471 | A1 | 8/2004 | MacDonald et al. |
| 2004/0166878 | A1 | 8/2004 | Erskine et al. |
| 2004/0203482 | A1 | 10/2004 | Bacon et al. |
| 2005/0130677 | A1 | 6/2005 | Meunier et al. |
| 2005/0190972 | A1 | 9/2005 | Thomas et al. |
| 2005/0208952 | A1 | 9/2005 | Dietrich et al. |
| 2006/0014548 | A1 | 1/2006 | Bolin et al. |
| 2006/0017842 | A1 | 1/2006 | Jun |
| 2006/0050149 | A1 | 3/2006 | Lang et al. |
| 2007/0109407 | A1 | 5/2007 | Thompson |
| 2008/0039114 | A1 | 2/2008 | Phatak et al. |
| 2008/0112699 | A1 | 5/2008 | Huseth et al. |
| 2008/0180537 | A1 * | 7/2008 | Weinberg ............ H04N 5/2256 348/211.99 |
| 2011/0096166 | A1 | 4/2011 | Englander et al. |
| 2011/0168783 | A1 | 7/2011 | Yoder |
| 2012/0169842 | A1 * | 7/2012 | Chuang ............ G08B 13/19619 348/39 |
| 2014/0146132 | A1 * | 5/2014 | Bagnato ............ H04N 5/23206 348/36 |
| 2014/0354828 | A1 * | 12/2014 | Rubinstein ............ G06T 3/0068 348/187 |
| 2015/0103171 | A1 | 4/2015 | Cho |
| 2015/0172518 | A1 | 6/2015 | Lucas et al. |
| 2015/0348580 | A1 | 12/2015 | van Hoff et al. |
| 2016/0037085 | A1 * | 2/2016 | Mills .................... H04N 5/2628 348/222.1 |
| 2016/0173737 | A1 | 6/2016 | Cho |
| 2016/0357092 | A1 | 12/2016 | Donaldson |
| 2016/0366336 | A1 | 12/2016 | Kuehnle et al. |
| 2017/0278365 | A1 * | 9/2017 | Madar .................... H04N 7/181 |

FOREIGN PATENT DOCUMENTS

| | | | | |
|---|---|---|---|---|
| EP | | 1594322 A2 * | 11/2005 | ............ G06K 9/209 |
| EP | | 2 110 795 | 10/2009 | |
| EP | | 2791868 B1 * | 9/2017 | |
| WO | WO 2004042667 | | 5/2004 | |

OTHER PUBLICATIONS

Partial Search Report of the International Searching Authority, dated Oct. 10, 2018, from International Application No. PCT/US2018/039895, filed on Jun. 28, 2018. 9 pages.
Axis Q3709-PVE Network Camera: data sheet, 2015: Axis Communications AG. Two pages.
Dahua Technology: Multi-Sensor Panoramic Camera DH-IPC-PFW8601N-H-A180: data sheet, earlier than Jun. 8, 2017: www.dahuasecurity.com. Three pages.
Hikvision DS-2CD6986F-(H) Pano-vu Series Panoramic Dome Camera: specification, 2015: Hikvision Digital Technology Co., Ltd. Four pages.
Hikvision DS-2DP1636-D Pano-vu Series 360 degree Panoramic Camera: specification, 2015: Hikvision Digital Technology Co., Ltd. Four pages.
Optera Imm Series with SureVision 2.0 180 degree, 270 degree, 360 degree Panoramic, 12 MPX IP Cameras: specification, earlier than Jun. 8, 2017: Pelco by Schneider Electric. Six pages.
Vivotek S Series MS8391-EV Multiple Sensor Network Camera: data sheet, earlier than Jun. 8, 2017: Vivotek Inc. Three pages.
Vivotek S Series MS8392-EV Multiple-Sensor Dome Network Camera: data sheet, earlier than Jun. 8, 2017: Vivotek Inc. Three pages.
Wisenet PNM-9020V 7.3 Megapixel Multi-Sensor 180 degree Panoramic Camera: data sheet, earlier than Jun. 8, 2017: Hanwha Techwin Co., Ltd. One page.
International Search Report and Written Opinion of the International Searching Authority, dated Dec. 19, 2018, from International Application No. PCT/US2018/052908 filed on Sep. 26, 2018. 14 pages. (WO3).
International Search Report and Written Opinion of the International Searching Authority, dated Dec. 7, 2018, from International Application No. PCT/US2018/039895, filed on Jun. 28, 2018. 17 pages. (WO1).
International Search Report and Written Opinion of the International Searching Authority, dated Feb. 18, 2019, from International Application No. PCT/US2018/052901, filed on Sep. 26, 2018. 18 pages. (WO2).
Partial Search Report of the International Searching Authority, dated Dec. 18, 2018, from International Application No. PCT/US2018/052901, filed on Sep. 26, 2018. 11 pages. (WO2).

* cited by examiner

SECURITY CAMERA SYSTEM WITH MULTI-DIRECTIONAL MOUNT AND METHOD OF OPERATION

RELATED APPLICATIONS

This application claims the benefit under 35 USC 119(e) of U.S. Provisional Application No. 62/566,114, filed on Sep. 29, 2017, which application is incorporated herein by reference in its entirety.

This application is related to U.S. application Ser. No. 15/818,816 filed on Nov. 21, 2017, entitled "Security Camera System with Multi-Directional Mount and Method of Operation," now U.S. Patent Publication No.: 2019/0005788 A1, and U.S. application Ser. No. 15/818,818 filed on Nov. 21, 2017, entitled "Security Camera System with Multi-Directional Mount and Method of Operation," now U.S. Patent Publication No.: 2019/0104282 A1.

BACKGROUND OF THE INVENTION

Video surveillance, e.g., security, systems are often deployed in and around buildings as well as in metropolitan settings. Example buildings and metropolitan settings include schools, government buildings, commercial buildings, residential buildings, multi dwelling units, roads and highways, and town and city centers.

These video security systems typically include surveillance, e.g., security, cameras that connect via a security network to a control system. Additional components include network video recorder (NVR) systems, also known as video management systems, and monitors for displaying images such as video from the security cameras.

The security cameras typically have a lenses and imager systems that are fixed, adjustable, or motorized. A fixed security camera will have the lens and imager system permanently fixed in a set position (i.e., lens and imager system cannot change position with respect to camera body). On the other hand, an adjustable security camera's lens and imager system is movable with respect to camera body (e.g., installer can move the lens and imager system to different positions) so that it can be pointed down a hall or at a door, for example. A motorized security camera, such as a pan-tilt-zoom (PTZ) security camera, utilizes motor(s) to automatically move the lens and imager system to different positions usually under operator or automatic control.

Multi-sensor security cameras, also known as multi-imager cameras, have also been deployed to capture a wide field of view. A typical multi-sensor security camera comprises two to four sensor modules. Each sensor module has a lens and imager system. The sensor modules are positioned or repositioned to cover the panoramic field of view while minimizing or eliminating blind spots. Typically, multi-sensor security cameras are designed either with sensor modules that are fixed in place or with a mechanical positioning system that can tilt the sensor modules up and down or sideways according to the specific mechanical design of the security camera system.

More recently, security cameras have been proposed that implement a single, universal design for a security camera system with a variable number of sensor modules and fields of view. An example of one such system is described in U.S. patent application Ser. No. 15/638,711 to Siu, entitled "SECURITY CAMERA SYSTEM WITH MULTI-DIRECTIONAL MOUNT AND METHOD OF OPERATION", which is incorporated herein by reference in its entirety. The security camera system includes a base unit, including a mounting dome, the surface of which includes several mounting sockets to which a variable number of sensor modules are attached mechanically or magnetically. The sensor modules can be powered wirelessly via magnetic induction. Similarly, the sensor modules might communicate with a base unit of the security camera system via low power wireless technology such as Bluetooth Low Energy (BLE), near-field communication (NFC), LiFi, and visible light communication (VLC), among other examples. The availability of several mounting sockets on the mounting dome provides practically unlimited arrangements of sensor modules, eliminating the blind spots imposed by previous mechanical designs. The variable number of sensor modules also allows for a single, universal design, regardless of the desired field of view of the security camera system, significantly reducing the complexity and cost of design, manufacturing and installation, as well as the development cycle time.

SUMMARY OF THE INVENTION

The flexibility offered by these multi-sensor security camera systems in creating customized panoramic fields of view by attaching different combinations of sensor modules to different mounting sockets of a mounting dome presents an additional challenge of determining the location and orientation of the sensor modules and associating the location and orientation of the different sensor modules with image data captured by those sensor modules in order to perform image stitching and other image analytics functions.

The present invention concerns the automatic detection of each sensor module's location on the mounting dome.

In one embodiment, an application running on a mobile computing device is used to determine the location of a sensor module. When the sensor module is attached to a mounting socket, an image of the configuration is captured by the mobile computing device. The mobile application uses image analysis to determine where the sensor module was located and sends a corresponding signal to the control electronics or software. This image analysis can also be performed on the base unit of the security camera system or on a remote server, among other examples.

In another embodiment, image analytics using external points of reference is used to determine the locations of sensor modules on the dome. For example, at least three visually identifiable objects (points of reference) can be placed in an area surrounding the security camera system. The sensor modules are positioned on the dome. A panoramic source image of the surrounding area as seen from the installed location of the security camera system is uploaded, and a reference image is generated with three or more points of reference identified as markers in each quadrant. The base unit determines the sensor modules' locations by comparing and matching the image data from each sensor module to the reference image, using the points of reference and markers to reduce processing time and resource consumption.

In general, according to one aspect, the invention features a security camera system comprising a base unit and sensor modules for generating image data. The base unit includes a plurality of mounting points, at which the sensor modules attach to the base unit. A mapping module receives reference images and determines positions of the sensor modules based on the reference images.

In embodiments, the reference images are generated based on images captured by mobile computing devices.

The reference images can be based on captured images depicting the security camera system itself. In this case, the mapping module detects the presence of sensor modules in the reference images and determines the positions of the detected sensor modules relative to a reference point visible on an exterior surface of the security camera system depicted in the reference images.

On the other hand, the reference images can also be based on captured images depicting an area surrounding the security camera system. In this case, the area surrounding the security camera system would include a plurality of points of reference. For example, the points of reference would include three or more visually identifiable objects placed in the area. A marker module generates the reference images with markers designating the points of reference depicted in the captured images of the area surrounding the security camera system. The mapping module determines the positions of the sensor modules based on comparisons of the image data generated by the sensor modules to the reference images.

In both examples, the mapping module can execute on the base unit of the security camera system or on a mobile computing device and/or a remote server, in which case the mapping module sends identification information for the mounting points having attached sensor modules to the security camera system.

In general, according to another aspect, the invention features a method for configuring a multi-sensor security camera system including a base unit with a plurality of mounting points and sensor modules for attaching to the base unit at the mounting points and generating image data. A mapping module receives reference images and determines positions of the sensor modules based on the reference images.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein, rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
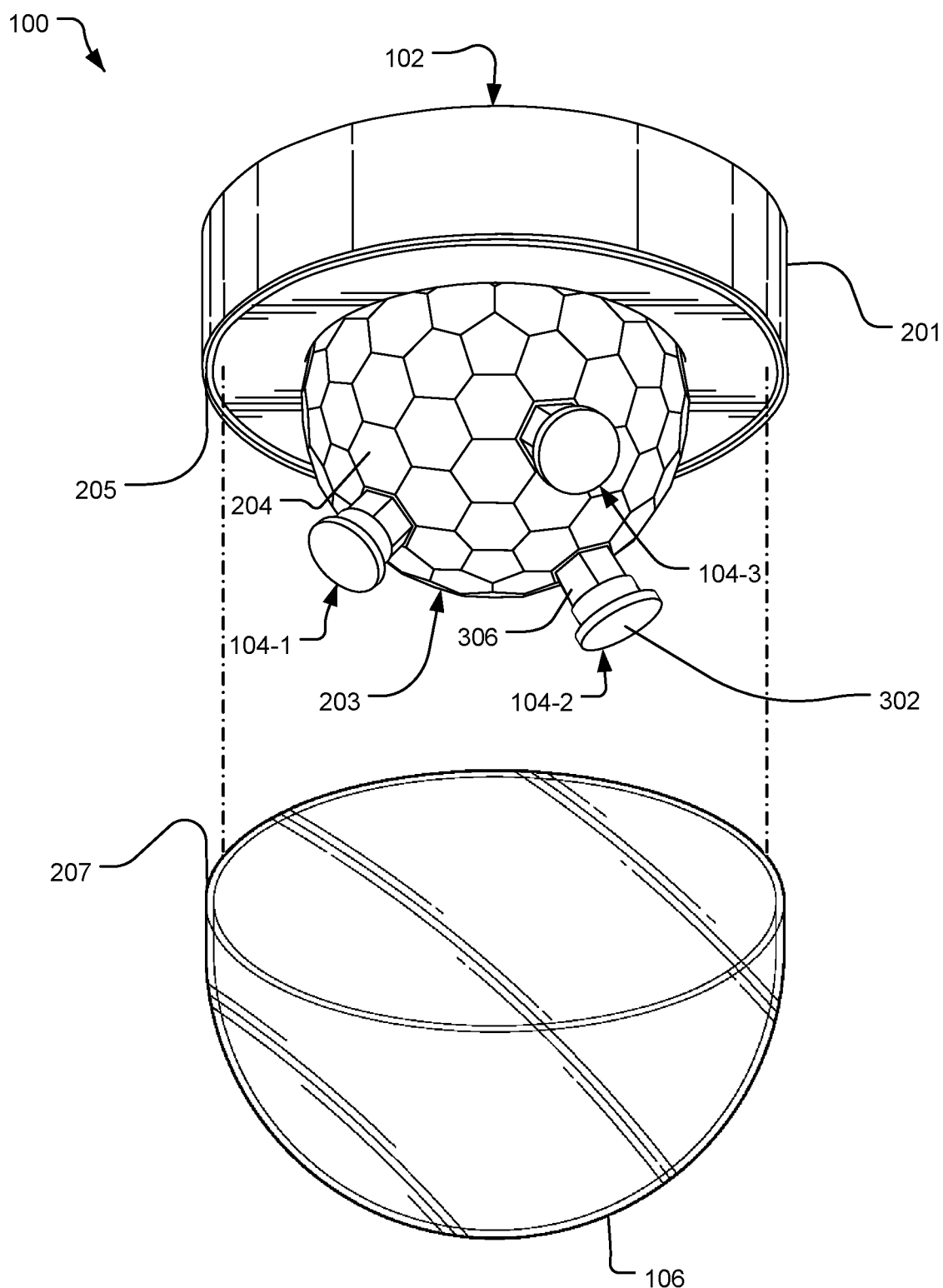
FIG. 1 is a perspective view of a security camera system to which the present invention is applicable, in which a transparent bubble is shown exploded off the security camera system.

FIG. 1 is a perspective view of a security camera system 100 to which the present invention is applicable.

The security camera system 100 includes a base unit 102, sensor modules 104 and a transparent bubble 106. The transparent bubble 106 is shown exploded off the security camera system 100.

The base unit 102 includes a camera base 201 and a mounting dome 203. The camera base 201 is a cylindrical assembly, a top circular surface of which faces and attaches to a surface of a building or other structure on which the security camera system 100 is mounted, typically a ceiling or wall or mounting bracket. The mounting dome 203 is a dome, such as a hemispherical dome, protruding from a bottom circular surface of the camera base 201 to which the sensor modules 104 attach.

The mounting dome 203 includes several mounting points, which are particular locations on the surface of the mounting dome at which sensor modules 104 are attached to the mounting dome 203 of the base unit 102. In the illustrated example, the mounting points are mounting sockets 204, which are identically-sized regions of the surface of the mounting dome 203 defined by raised ridges along the perimeters of the sockets and/or depressed regions within the interior of the sockets. The mounting sockets 204 are arrayed across the entire round surface of the mounting dome 203 such that the mounting sockets 204 face radially outward from a center of the hemispherical mounting dome 203 at regularly spaced intervals. Other examples of mounting points can include mesas and/or raised regions of the surface of the mounting dome 203, or even undifferentiated points on the surface of the mounting dome 203, among other examples.

In the illustrated example, the mounting sockets 204 are hexagonal depressions. The front portion of the mounting dome 203 (visible in the illustration) includes about thirty mounting sockets 204, and the mounting dome 203 in its entirety (including portions of the mounting dome 203 not visible in the illustration) would have about sixty mounting sockets 204 in total, as the mounting sockets 204 extend to cover the entire outer surface of the mounting dome 203.

In alternative embodiments, the mounting sockets 204 can be other shapes such as circles, octagons, pentagons, or triangles, among other examples. The size and number of the mounting sockets 204 could also vary, based on the different embodiments. In general, there are at least 4 mounting sockets, but 10, 15, or 20 or more is preferred. Regions between the mounting sockets 204 can separate the different mounting sockets 204, or the mounting sockets 204 can tile across the surface of the mounting dome 203 without any regions between the mounting sockets 204.

In general, the mounting sockets 204 represent regions of the mounting dome 203 to which the sensor modules 104 can be attached.

Each sensor module 104 includes a proximal end and a distal end. The distal end engages the exterior surface of the mounting dome 203 at a particular mounting point. At the distal end of the sensor module is a mounting plug 306. The mounting plug 306 is prismatic shaped in the illustrated embodiment, with a distal exterior surface sharing the same shape and approximate size as each of the mounting sockets 204 and engaging with the exterior surface of the mounting dome 203 within the perimeter of one of the mounting sockets 204.

In the illustrated example, the mounting plug 306 is a hexagonal prism, matching the hexagonal shape of the mounting sockets 204 depicted in the same illustration. However, in other embodiments in which the mounting sockets 204 take different shapes, the distal surface of the module mounting plug 306 would correspond to the shape of the mounting sockets 204.

At the proximal end of the sensor module 104 is a lens system 302, which is encased in a cylindrical assembly. In general, the sensor module 104 generates image data from light captured via the lens system 302, with the lens system forming an image of that light onto an image sensor, inside the module.

The sensor modules 104 are attached to the mounting dome 203 such that their optical axes extend radially from the center of the mounting dome 203 in different elevational and azimuthal directions, corresponding to the positions of the different mounting sockets 204 along the surface of the dome. In general, the number of sensor modules 104 and the selection of mounting sockets 204 to which the modules attach determines a field of view of the security camera system 100.

The transparent bubble 106 is a hollow, rigid, hemisphere of transparent material. A circular rim 207 (forming the perimeter of a circular, flat face of the transparent bubble 106) inserts into an attachment ridge 205 along the perimeter of the bottom face of the camera base 201 and is secured via an attachment mechanism such as a snap fit.

The transparent bubble 106 is secured to the camera base 201 such that it encases the mounting dome 203 and attached sensor modules 104.

Figure 2:
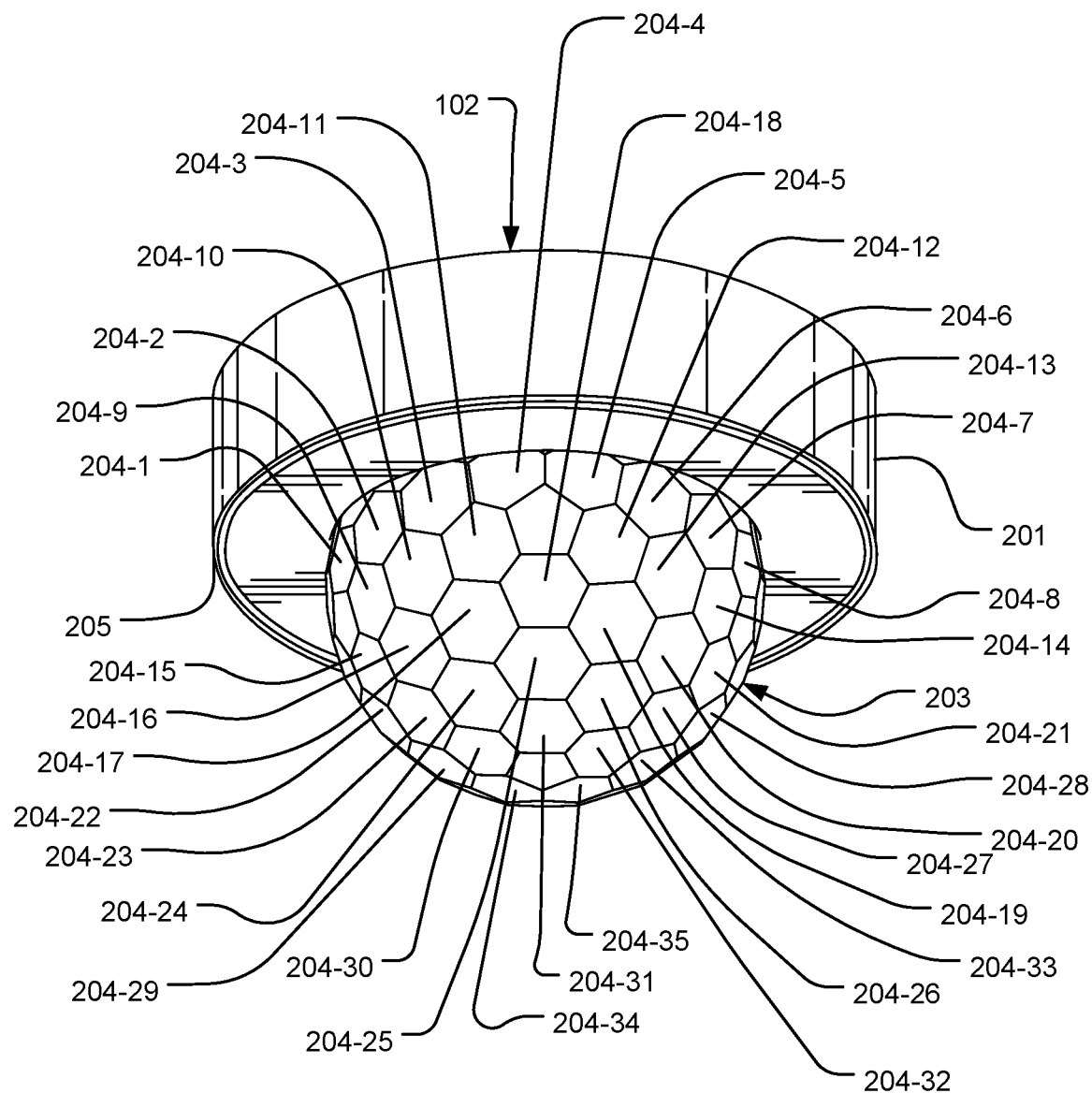
FIG. 2 is a perspective view of a base unit of the security camera system.

FIG. 2 is a perspective view of the base unit 102 of the security camera system 100 without any sensor modules 104 attached to it, depicting the camera base 201, mounting dome 203, mounting sockets 204 and attachment ridge 205. Here more of the mounting sockets have been labeled, specifically 204-1 to 204-35, to illustrate the number of potential locations at which the modular sensor modules 104 can be installed. A similar number of mounting sockets are available on the backside of the unit, but not shown in this view.

Figure 3:
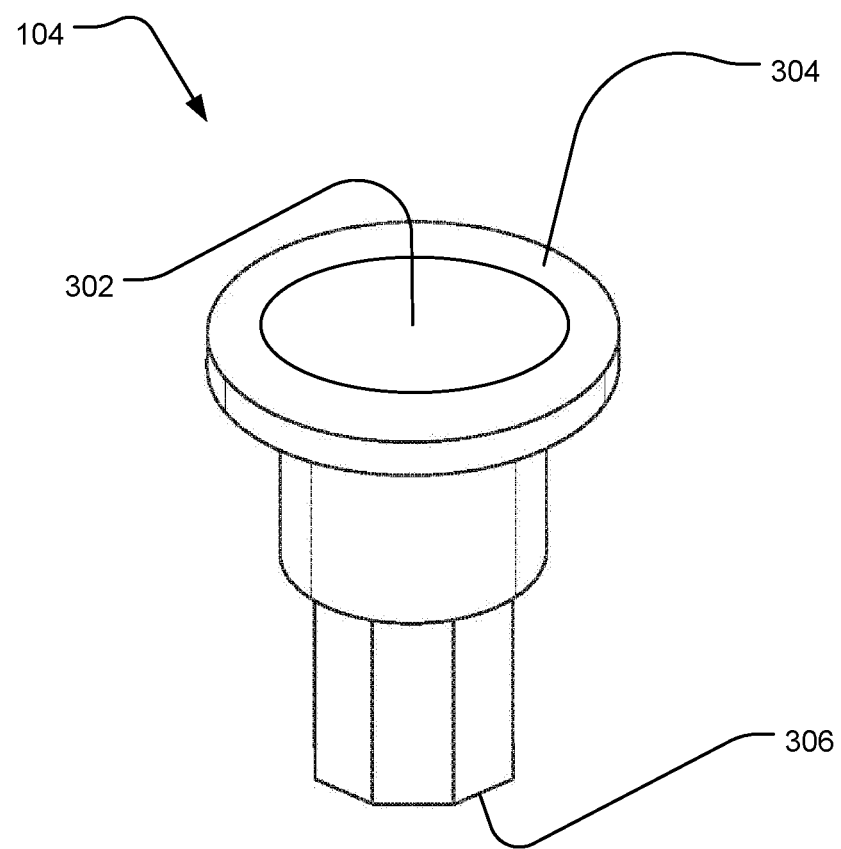
FIG. 3 is a perspective view of a sensor module of the security camera system.

FIG. 3 is a perspective view of the sensor module 104, depicting the lens system 302 and module mounting plug 306.

Also shown is a bubble contact ring 304, which is a ring of elastic material that compresses around the proximal end of the assembly containing the lens system 302 defining the module's entrance aperture. An interior surface of the transparent bubble 106 presses against the bubble contact ring 304 preventing movement and/or vibration of the sensor modules 104 and urging the sensor modules into their respective sockets.

Figure 4:
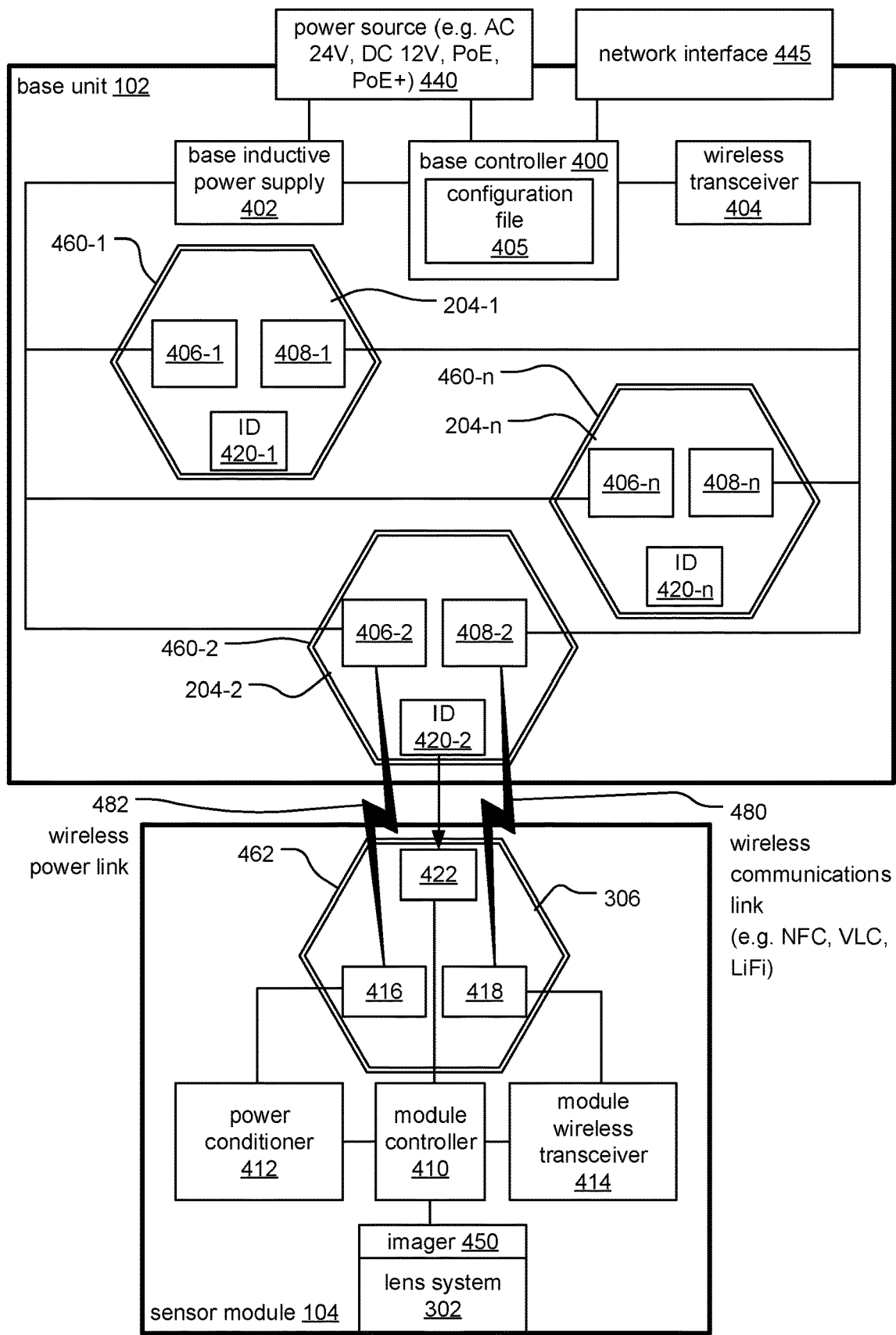
FIG. 4 is a schematic diagram of the base unit and the sensor module according to one embodiment of the present invention.

FIG. 4 is a schematic diagram of the base unit 102 and the sensor module 104 according to one embodiment of the current invention.

The base unit 102 includes a power source 440, a base inductive power supply 402, a base controller 400, a wireless transceiver 404, a network interface 445, and several mounting sockets 204. In the figure, only 3 mounting sockets are shown, but in the typical embodiment, the number of mounting sockets 204 would be at least 4, but typically 10 or more are provided. Each mounting socket includes a socket magnetic mount 460, an inductive power transmitter 406, a wireless antenna 408, and a socket identification (ID) module 420.

The sensor module 104 includes a module controller 410, a power conditioner 412, a module wireless transceiver 414, a lens system 302 and imager 450, and a module mounting plug 306, which includes a module magnetic mount 462, an inductive power receiver 416, a wireless antenna 418 and an ID reader module 422.

In general, the sensor module 104 generates image data. Incoming light is collected and focused by the lens system 302 on an imager 450, such as a CCD or CMOS imager. The image data is sent the base unit 102. The base unit 102 receives image data from one or more sensor modules 104 and associates the image data from each sensor module 104 with elevation and azimuth information associated with the mounting socket 204 to which the sensor module 104 is attached.

The power source 440 provides power to the components of the base unit 102 including the base controller 400 and the base inductive power supply 402. In different examples, the power source can be a battery, an AC 24V power supply, a DC 12V power supply, or a power supply utilizing Power over Ethernet (PoE) or PoE+ technologies.

The base controller 400 executes firmware instructions and, in general, sends instructions to and receives data from the base inductive power supply 402, sensor modules 104 via the wireless transceiver 404 and wireless antenna(s) 408, and the network interface 445. More specifically, the base controller 400 receives image data from the sensor modules 104 and sends it to a network video distribution system 701 via the network interface 445.

In the illustrated embodiment, the base unit 102 wirelessly provides power to the sensor modules 104 via the base inductive power supply 402, inductive power transmitters 406, inductive power receivers 416, and the power conditioner 412. When the sensor module 104 is attached to the mounting socket 204-2, the inductive power transmitter 406-2 at or near the surface of the mounting dome 203 in the region containing the mounting socket 204-2 come into proximity with the inductive power receiver 416 of the sensor module 104. The base inductive power supply 402 supplies an alternating current to the inductive power transmitter 406, which is, for example, a coil. An oscillating magnetic field is formed, which induces an alternating current in the inductive power receiver 416, as illustrated as a wireless power link 482. This alternating current is then conditioned by the power conditioner 412, for example, by converting it to direct current to power the sensor module 104.

The module controller 410 receives power from the power conditioner 412 and image data from the imager 450 (based on light captured by the lens system 302). The module controller 410 also sends instructions to and receives ID information (for the mounting socket 204 to which the sensor module 104 is attached) to and from the ID reader module 422. The module controller 410 sends the image data and the ID information to the base unit 102 via the wireless transceiver 414.

The base wireless transceiver 404 and the module wireless transceiver 414 wirelessly (e.g. via near-field communication, visible light communication or LiFi technologies) send and receive information to each other via a wireless communications link 480 between the base wireless antenna 408 and the module wireless antenna 418, respectively.

In general, the socket ID module 420 is a physical representation of a socket ID, which, in turn, is a unique identifier associated with each mounting socket 204. The socket ID is detected by the ID reader module 422 interacting with the socket ID module 420.

A configuration file 405 of the base unit 102 (for example, stored in nonvolatile memory of the base controller 400) includes information about the elevation and azimuth associated with the different fields of view from the mounting sockets 204. In the illustrated embodiment, in which each mounting socket 204 includes a socket ID module 420, the configuration file 405 directly associates the elevation and azimuth information for the different mounting sockets 204 with the socket IDs of the mounting sockets 204 (for example, in a table). In other examples, however, the configuration file 405 includes other identification information in addition to or instead of the socket IDs, including position information of the mounting sockets 204 (for example, with respect to a predetermined point on the base unit 102). Typically, this mapping of elevation and azimuth information to mounting sockets 204, using socket IDs and/or other identification information, was provided during an initial configuration of the base unit 102 during manufacturing.

The sensor modules 104 attach to the mounting sockets 204 via the socket magnetic mount 460 and the module magnetic mount 462. In one example, the magnetic mounts 460, 462 are formed of ferromagnetic material and/or magnets that are attracted to each other.

In the illustrated example, three mounting sockets 204-1, 204-2, 204-n are depicted, and the sensor module 104 is attached to mounting socket 204-2. The sensor module 104 would be attached to the mounting socket 204-2 in such a way to allow the inductive transmitter 406-2, wireless transceiver 408-2 and socket ID module 420-2 of the mounting socket 204-2 to interface with the inductive power receiver 416, wireless transceiver 418 and ID reader module 422 of the sensor module 106. In different examples, this may involve the components of the mounting socket 204 to come in direct contact with their counterparts on the sensor module 104, or to simply come in close proximity.

Figure 5:
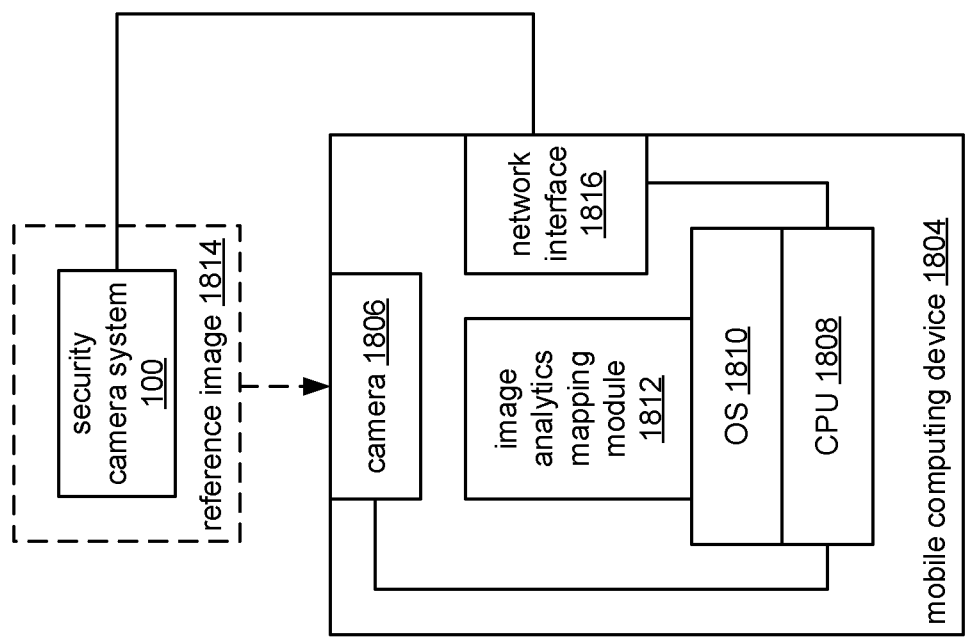
FIG. 5 is a schematic diagram showing a mobile computing device and the security camera system according to one embodiment of the present invention, in which the positions of the sensor modules are determined based on reference images depicting the security camera system.

FIG. 5 is a schematic diagram of a mobile computing device 1804 and the security camera system 100 according to one embodiment of the present invention, in which the positions of the sensor modules 104 are determined based on reference images 1814 depicting the security camera system 100.

An image analytics mapping module 1812 receives the reference image 1814 depicting the security camera system 100, including the base unit 102 and any attached sensor modules 104, and determines the positions of the sensor modules 104 based on detecting the presence of the sensor modules 104 in the reference images 1814. In one example, the image analytics mapping module 1812 determines the positions of the detected sensor modules 104 relative to a reference point 1802, which is one or more markings that are visible on an exterior surface of the security camera system 100 (for example, the base unit 102) and depicted in the reference images 1814. The image analytics mapping module 1812 translates the positions of the detected sensor modules 104 relative to the reference point 1802 to identification information (such as socket IDs) for the mounting sockets 204 corresponding to the positions, based on predetermined configuration settings or the configuration file 405, among other examples.

In the illustrated embodiment, the image analytics mapping module 1812 executes on a mobile computing device 1804. The mobile computing device 1804 could be a laptop computer, tablet computer, phablet computer (i.e., a mobile device that is typically larger than a smart phone, but smaller than a tablet), or smart watch, to list a few examples. Typically, such devices include an operating system 1810 (such as the IOS operating system from Apple Corp. or Android operating system from Google, Inc.) executing on a central processing unit (CPU) 1808 of the mobile computing device 1804. However, in other embodiments, the image analytics mapping module 1812 executes on a remote server or on the base unit 102 itself.

The image analytics mapping module 1812 sends to the security camera system 100 identification information (such as the socket ID) for the mounting sockets 204 which have attached sensor modules 104. In order to communicate with the security camera system 100, the mobile computing device 1804 includes a wireless and/or wired network interface 1816. The identification information can be sent from the mobile computing device 1804 to the security camera system 100 directly, via a peer-to-peer wireless network, or via intermediaries like a public network such as the internet and/or a connected network video distribution system 701, among other examples. Information exchanged between the mobile computing device 1804 and security camera system 100 can be encrypted or unencrypted, and can be sent via a secure tunneling protocol such as Secure Shell (SSH), among other examples.

In the illustrated example, the reference image 1814 is generated by the mobile computing device 1804 based on an image captured via a camera 1806 of the mobile computing device 1804.

Figure 6:
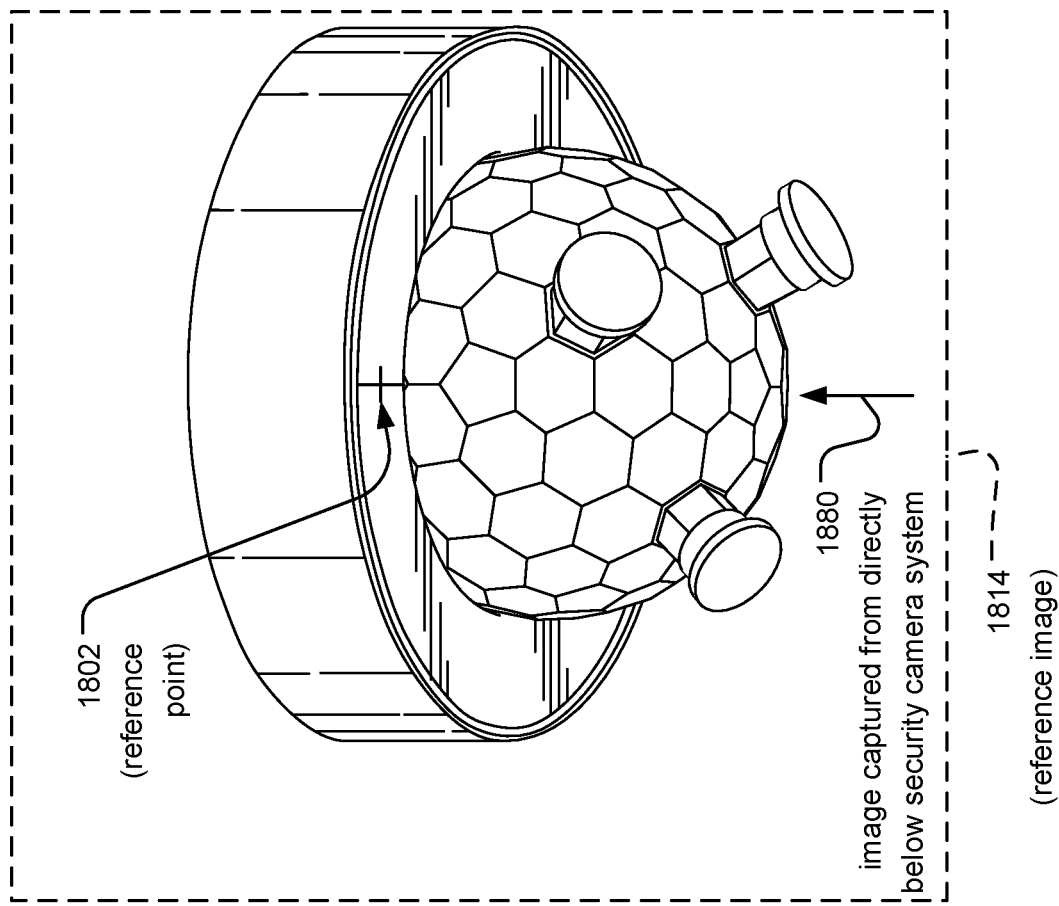
FIG. 6 is a schematic diagram showing an exemplary reference image depicting the security camera system.

FIG. 6 is a schematic diagram illustrating an exemplary reference image 1814 depicting the security camera system 100.

In the illustrated example, a directional marker 1880 indicates that the reference image 1814 would be captured from directly below the security camera system 100, for example, by the mobile computing device 1804. The reference point 1802, which is illustrated as two perpendicular lines marked on the exterior of the base unit 102, is depicted in the reference image 1814, allowing the image analytics mapping module 1812 to determine the correct positions of the sensor modules 104 with respect to the reference point 1802.

Figure 7:
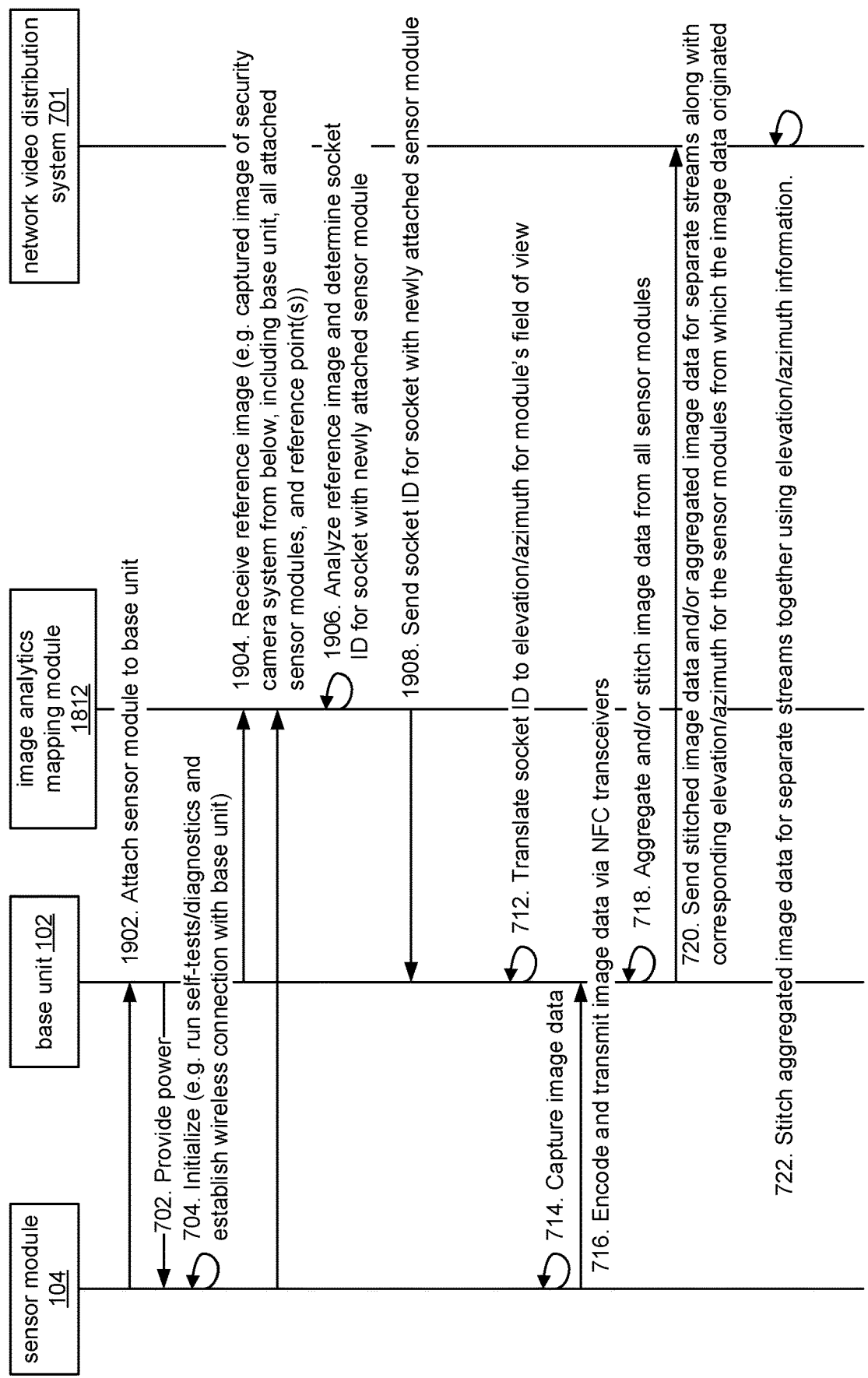
FIG. 7 is a sequence diagram illustrating the process by which the base unit determines the location of the sensor modules based on an analysis of a reference image depicting the security camera system and then reports to a network video distribution system.

FIG. 7 is a sequence diagram illustrating the process by which the base unit 102 determines the location of the sensor modules 104 based on an analysis of a reference image 1812 depicting the security camera system 100 and then reports to a network video distribution system 701.

In step 1902, one or more sensor modules 104 are attached to the base unit 102 at mounting points such as mounting sockets 204.

In step 702, the base unit 102 provides power to the sensor module 104. This can be done inductively as previously described or via a wired connection.

In step 704, the sensor module 104 initializes itself in response to receiving power from the sensor module 104. In one example, the sensor module 104 runs self-tests/diagnostic procedures and establishes wireless communications with the base unit 102 as well as sends unique identification information for the sensor module 104, such as a sensor module ID, to the base unit 102.

In step 1904, the image analytics mapping module 1812 receives the reference image 1814 depicting the security camera system 100. In one example, the reference image 1814 is captured from directly below the security camera system 100 by the mobile computing device 1804 via the camera 1806 and depicts the base unit 102, all attached sensor modules 104, and the reference point 1802.

In step 1906, the image analytics mapping module 1812 analyzes the reference image 1814 and generates identification information (such as the socket ID) for the mounting sockets 204 having attached sensor modules 104. In one example, this is done by determining the positions of attached sensor modules 104 with respect to the reference point 1802 and translating the positions to socket IDs for the corresponding mounting sockets 204.

In step 1908, image analytics mapping module 1812 sends the socket ID(s) to the base unit 102. In one example, the image analytics mapping module 1812 executes on the mobile computing device 1804 and sends the socket ID(s) to the base unit 102 via the network interface 1816, directly, or via intermediaries such as the public network or the network video distribution system 701. In another example, the image analytics mapping module 1812 executes on a remote server and sends the socket ID(s) to the base unit 102 in a similar fashion. In yet another example, the image analytics mapping module 1812 executes on the base unit 102 and simply returns the socket ID(s) to a different process or module of the base unit 102.

In step 712, the base unit 102 translates the socket ID received from the sensor module 104 into elevation/azimuth information for the sensor module's 104 field of view by, for example, retrieving the elevation/azimuth information associated with the socket ID from the configuration file 405.

In step 714, the sensor module 104 captures image data, which is then encoded and transmitted to the base unit 102 in step 716.

In step 718, the base unit 102 aggregates the image data from all of the sensor modules 104 or, alternately, stitches together the image data from each of the sensor modules 104 based on the elevation/azimuth information. In step 720, depending on the step 718, either the aggregated image data comprising the separate streams for each sensor module 104, along with the corresponding elevation/azimuth information, or the stitched image data, are sent to the network video distribution system 701. In one example, the elevation/azimuth information is included as meta-data of the image data.

Finally, in step 722, the network video distribution system 701 uses the elevation/azimuth information pertaining to each of the sensor modules 104 to stitch together the image data if it was not previously stitched together by the base unit 102.

The previously described process can occur for individual sensor modules 104 or groups of sensor modules 104. In one example, after a single sensor module 104 is attached to a mounting socket 204, a reference image 1814 is generated and processed by the image analytics mapping module 1812, allowing the base unit 102 to receive identification information such as a device ID for the sensor module 104 from the sensor module 104 and associate the sensor module device ID with the single socket ID returned by the image analytics mapping module 1812. This process would then repeat, as a new sensor module 104 is attached, and a new reference image 1814 is generated depicting the previously identified sensor module 104 and the newly attached sensor module 104.

Figure 8:
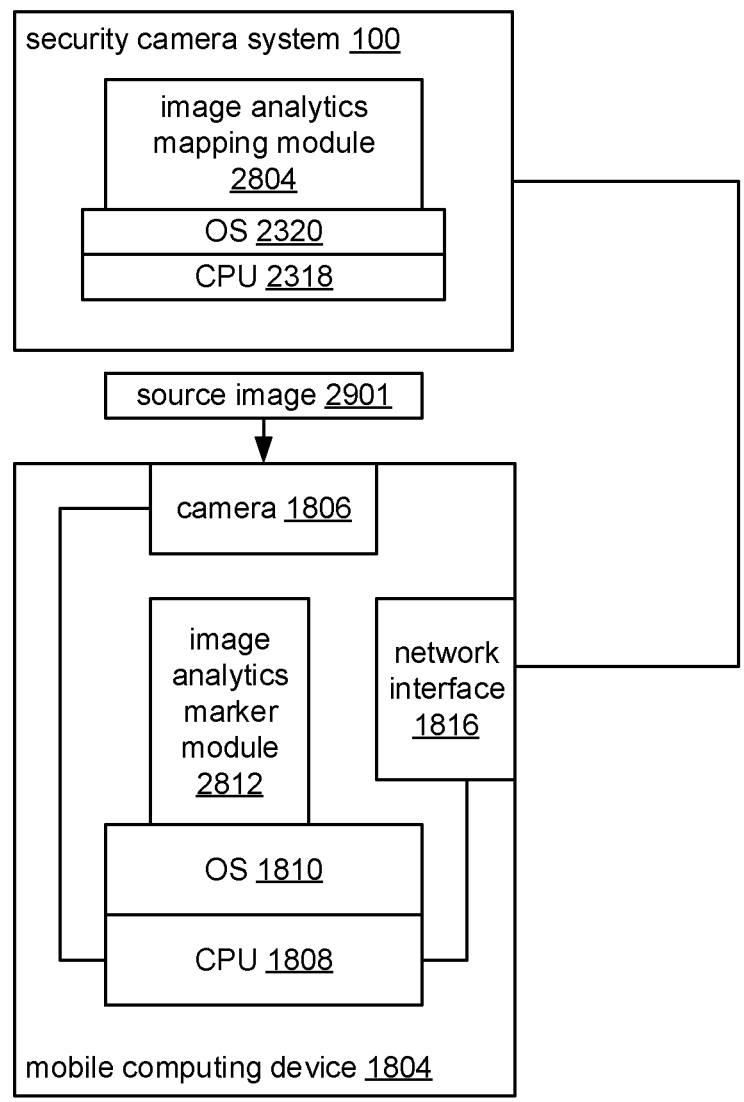
FIG. 8 is a schematic diagram showing the mobile computing device and the security camera system according another embodiment of the present invention, in which the positions of the sensor modules are determined based on reference images depicting an area surrounding the security camera system.

FIG. 8 is a schematic diagram of the mobile computing device 1804 and the security camera system 100 according another embodiment of the present invention, in which the positions of the sensor modules 104 are determined based on reference images 1814 depicting an area surrounding the security camera system 100.

As opposed to the previous embodiment, now the reference image 1814 depicts the area surrounding the security camera system 100 and includes a plurality of points of reference 2802 (for example, three or more). The points of reference 2802 are visually identifiable objects that exist or are deliberately placed in the area surrounding the security camera system 100. The image analytics mapping module 2804 receives the reference image 1814 and determines the positions of the sensor modules 104 based on comparing the image data generated by the sensor modules 104 to the reference image 1814. More specifically, the image analytics mapping module 2804 matches the points of reference 2802 depicted in the reference image 1814 with the same points of reference 2802 detected in the image data from the sensor modules 104 in order to determine field of view information (such as elevation/azimuth information) of the different sensor modules 104. The image analytics mapping module 1812 translates the field of view information to identification information (such as socket IDs) for the mounting sockets 204 having attached sensor modules 104, again based on predetermined configuration settings or the configuration file 405, among other examples.

In the illustrated embodiment, the reference image 1814 is generated by an image analytics marker module 2812 executing on the mobile computing device 1804. The reference image 1814 is based on a source image 2901, which is a panoramic image of the area surrounding the security camera system 100 captured via the camera 1806 of the mobile computing device 1804. The image analytics marker module 2812 detects the points of reference 2802 (for example, via object recognition) and the points of reference are indicated with markers 2904 to facilitate the analysis. The image analytics marker module 2812 sends the reference image 1814 to the image analytics mapping module 2804, which, in this embodiment, executes on the base unit 102. As before, in different embodiments, the two modules 2804, 2812 could execute on any combination of the mobile computing device 1804, the base unit 102, and/or a remote server, among other examples.

Figure 9:
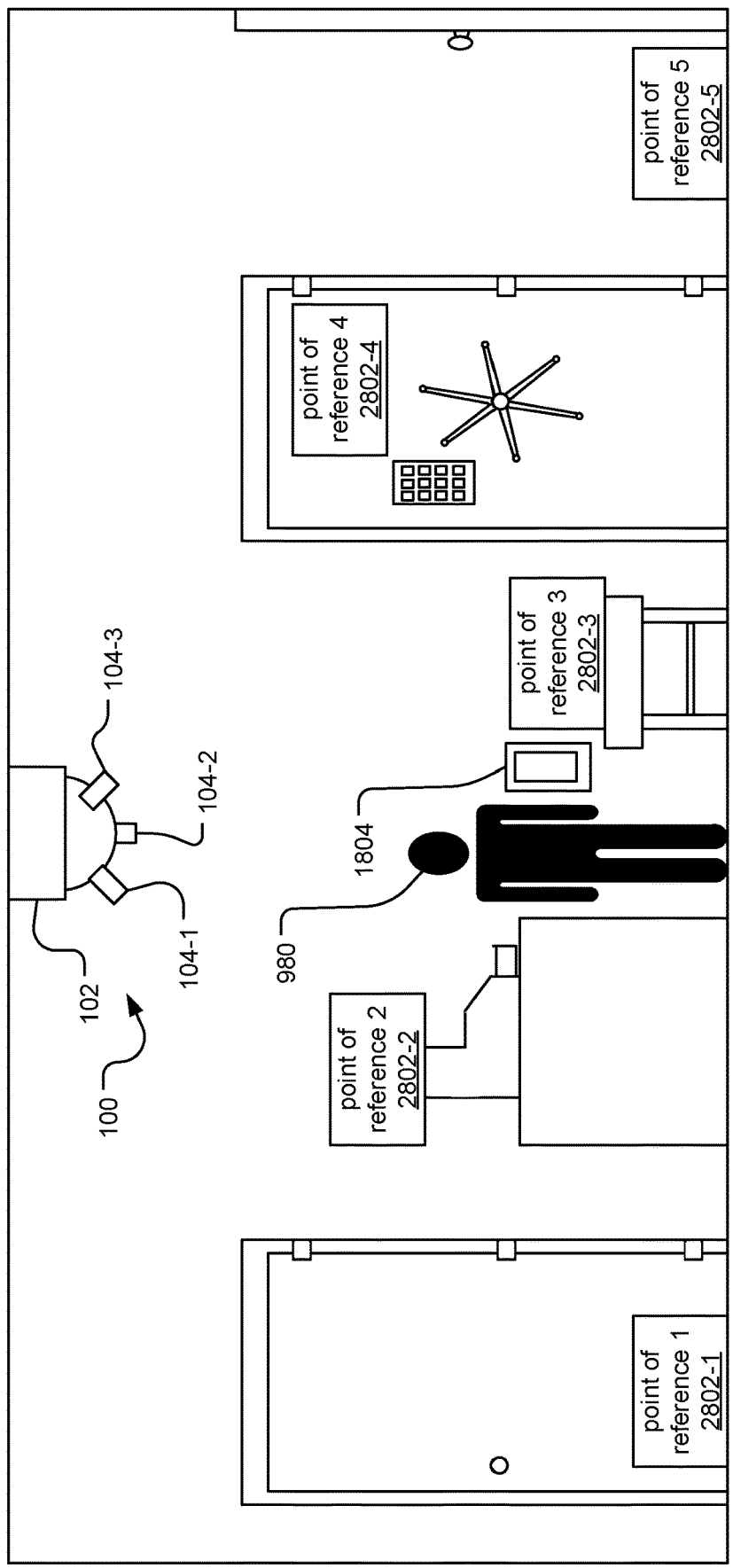
FIG. 9 is an illustration of an exemplary security camera system showing an area surrounding the security camera system with multiple external points of reference.

FIG. 9 is an illustration of an exemplary security camera system 100 showing an area surrounding the security camera system 100 with multiple external points of reference 2802.

In the illustrated example, the security camera system 100 includes three sensor modules 104 with different fields of view based on the different elevational and azimuthal directions of the mounting sockets 204 to which the sensor modules 104 are attached. Five points of reference 2802 are distributed throughout the area at varying distances from the security camera system 100 and from each other. In one example, the points of reference 2802 are visually identifiable objects placed in the area surrounding the security camera system 100, for example, by a technician 980 installing and configuring the security camera system 100. A panoramic source image 2901 of this area will be generated, for example, via the camera 1806 of the mobile computing device 1804.

Figure 10:
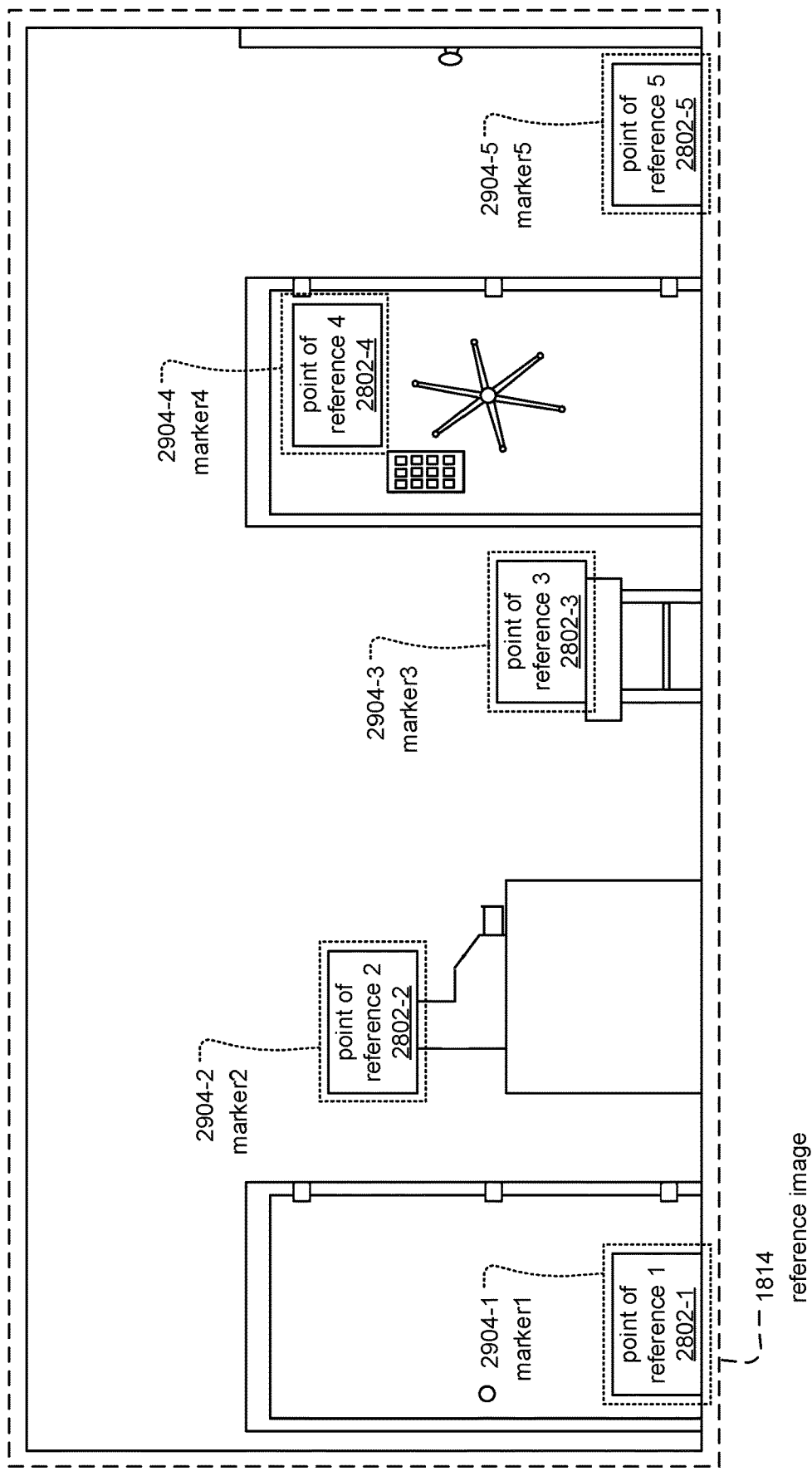
FIG. 10 is a schematic diagram illustrating an exemplary reference image generated by the image analytics marker module showing markers indicating each of the external points of reference.

FIG. 10 is a schematic diagram illustrating an exemplary reference image 1814 generated by the image analytics marker module 2812 showing markers 2904 indicating each of the external points of reference 2802. The markers 2904 include information about the points of reference 2802 including, for example, position information for the points of reference 2902 with respect to the reference image, location information, including information about the points' of reference 2802 location with respect to the security camera system 100, and identification information for distinguishing the different points of reference 2802 from each other, among other examples.

Figure 11:
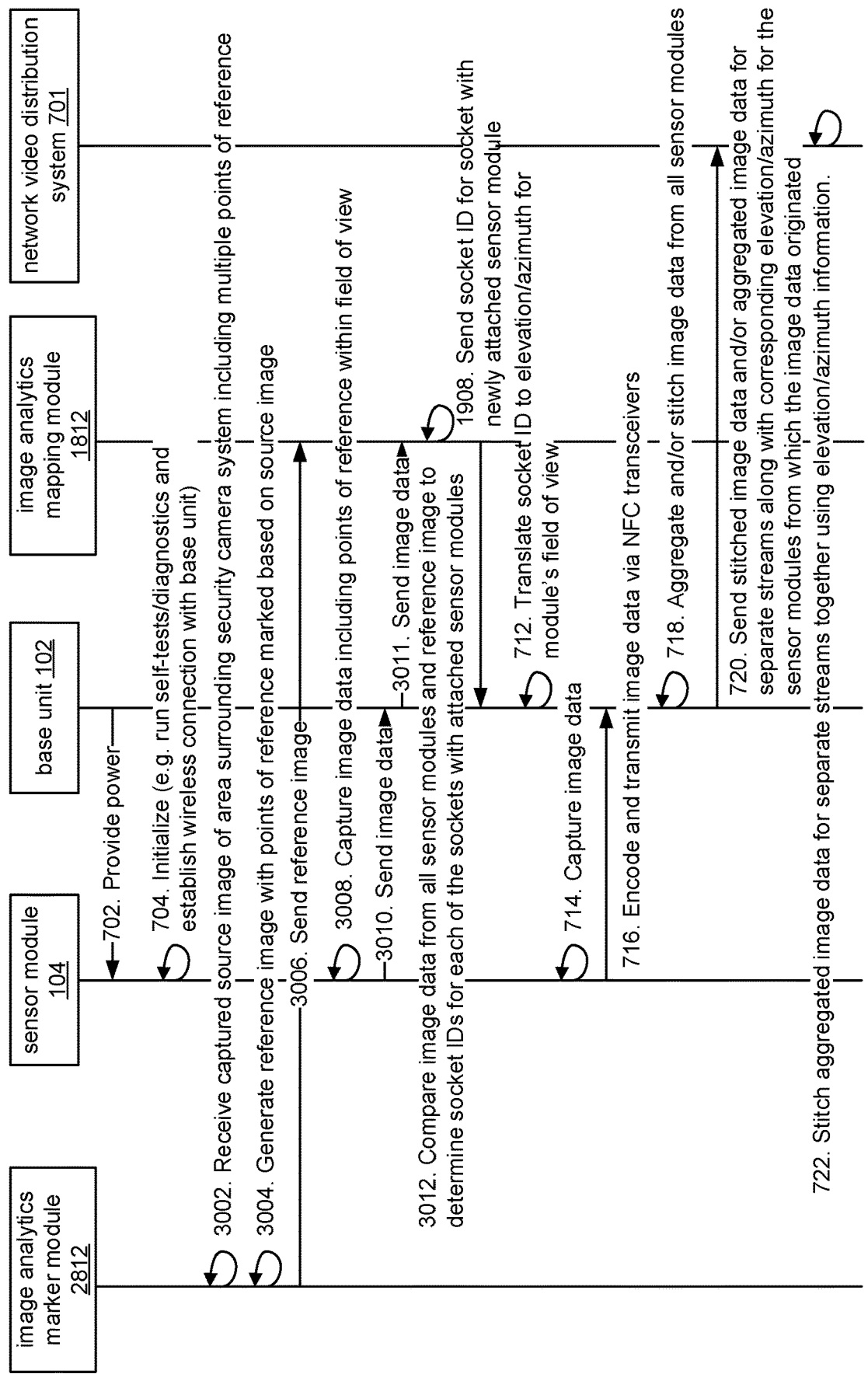
FIG. 11 is a sequence diagram illustrating the process by which the base unit determines the location of the sensor modules, based on a comparison of the reference image generated by the image analytics marker module to the image data captured by the sensor modules, and then reports to the network video distribution system.

FIG. 11 is a sequence diagram illustrating the process by which the base unit 102 determines the location of the sensor modules 104, based on a comparison of the reference image 1814 generated by the image analytics marker module 1804 to the image data captured by the sensor modules 104, and then reports to the network video distribution system 701.

Steps 702 and 704 proceed as previously described.

Now, however, in step 3002, the image analytics marker module 1804 receives the source image 2901 (e.g. a panoramic image depicting the area surrounding the security camera system 100) including multiple points of reference 2802. In step 3004, the image analytics marker module generates the reference image 1814 based on the source image 2901 with the points of reference 2802 indicated with markers 2904. The reference image 1814 is sent from the image analytics marker module 2812 to the image analytics mapping module 1812 in step 3006.

In step 3008, the sensor modules 104 capture image data depicting portions of the area surrounding the security camera system 100 based on the different fields of view of the sensor modules 104 including any points of reference 2802 visible to the sensor modules 104. The image data is sent from the sensor modules 104 to the base unit 102 in step 3010 and from the base unit 102 to the image analytics mapping module 1812 in step 3011.

In step 3012, the image analytics mapping module 1812 compares the image data from all of the sensor modules 104 to the reference image 1814 and generates identification information (such as the socket IDs) for the mounting sockets 204 to which the sensor modules 104 are attached.

Finally, steps 1908 and 712 through 722 proceed as previously described.

While this invention has been particularly shown and described with references to preferred embodiments thereof, it will be understood by those skilled in the art that various changes in form and details may be made therein without departing from the scope of the invention encompassed by the appended claims.

What is claimed is:

1. A security camera system, comprising:
a base unit including a plurality of mounting points;
sensor modules for attaching to the base unit at the mounting points and generating image data; and
a mapping module, which executes on a central processing unit of the base unit or of a computing device, for receiving reference images and determining positions of the sensor modules based on the reference images, wherein the reference images are generated based on images captured via a camera of a mobile computing device, the captured images depicting the base unit and the sensor modules attached to the base unit, and the mapping module determines the positions of the sensor modules based on detecting the presence of sensor modules in the reference images and determining the positions of the detected sensor modules relative to a reference point visible on an exterior surface of the security camera system depicted in the reference images.

2. The system as claimed in claim 1, wherein the mapping module executes on a mobile computing device and/or a remote server and sends identification information for the mounting points having attached sensor modules to the security camera system.

3. The system as claimed in claim 1, wherein the mapping module executes on the base unit of the security camera system.

4. The system as claimed in claim 1, wherein:
the sensor modules are attached to a hemispherical mounting dome of the base unit such that optical axes of the sensor modules extend radially from a center of the mounting dome in different elevational and azimuthal directions that correspond to positions of the mounting points along a surface of the mounting dome, with a field of view of the security camera system based on a number of sensor modules and selection of mounting points to which the sensor modules attach;
the base unit receives the image data from the sensor modules and associates the image data from each sensor module with elevation and azimuth information associated with the mounting point to which the sensor module is attached, the elevation and azimuth information indicating the elevational and azimuthal direction corresponding to the position of the mounting point; and the base unit comprises nonvolatile memory for storing the elevation and. azimuth information associated with each mounting point.

5. The system as claimed in claim 1, wherein the reference images are captured via the camera of the mobile computing device from a position directly below the security camera system and depict the base unit, the reference point, which is visibly marked on an exterior of the base unit, and all sensor modules attached to the base unit.

6. The system as claimed in claim 5, wherein the mapping module identifies the mounting points to which the detected sensor modules are attached by translating the positions of the detected sensor modules relative to the reference point to identification information for the mounting points to which the detected sensor modules are attached based on predetermined configuration settings.

7. The system as claimed in claim 6, wherein the mapping module translates the identification information into elevation and azimuth information for the sensor module's field of view, the elevation and azimuth information being used to stitch together the image data captured by the different sensor modules.

8. The system as claimed in claim 1, wherein as each sensor module is newly attached to the base unit, the base unit receives new device identification information for the newly attached sensor module, the mapping module determines a position of the newly attached sensor module based on a newly generated reference image depicting any previously identified sensor modules and the newly attached sensor module, and the new device identification information is associated with the position of the newly attached sensor module, with the process repeating for each subsequently attached sensor module.

9. A method for configuring a multi-sensor security camera system including a base unit with a plurality of mounting points and sensor modules for attaching to the base unit at the mounting points and generating image data, the method comprising:
  a mapping module, which executes on a central processing unit of the base unit or of a computing device, receiving reference images and determining positions of the sensor modules based on the reference images;
  generating the reference images based on images captured via a camera of a mobile computing device, the captured images depicting the base unit and the sensor modules attached to the base unit; and
  the mapping module determining the positions of the sensor modules based on detecting the presence of sensor modules in the reference images and determining the positions of the detected sensor modules relative to a reference point visible on an exterior surface of the security camera system depicted in the reference images.

10. The method as claimed in claim 9, further comprising the mapping module executing on a mobile computing device and/or a remote server and sending identification information for the mounting points having attached sensor modules to the security camera system.

11. The method as claimed in claim 9, further comprising the mapping module executing on the base unit of the security camera system.

12. The method as claimed in claim 9, wherein:
  the sensor modules are attached to a hemispherical mounting dome of the base unit such that optical axes of the sensor modules extend radially from a center of the mounting dome in different elevational and azimuthal directions that correspond to positions of the mounting points along a surface of the mounting dome, with a field of view of the security camera system based on a number of sensor modules and selection of mounting points to which the sensor modules attach;
  the base unit receives the image data from the sensor modules and associates the image data from each sensor module with elevation and azimuth information associated with the mounting point to which the sensor module is attached, the elevation and azimuth information indicating the elevational and azimuthal direction corresponding to the position of the mounting point; and
  the base unit comprises nonvolatile memory for storing the elevation and azimuth information associated with each mounting point.

13. The method as claimed in claim 9, further comprising capturing the reference images via the camera of the mobile computing device from a position directly below the security camera system, wherein the reference images depict the base unit, the reference point, which is visibly marked on an exterior of the base unit, and all sensor modules attached to the base unit.

14. The method as claimed in claim 13, further comprising the mapping module identifying the mounting points to which the detected sensor modules are attached by translating the positions of the detected sensor modules relative to the reference point to identification information for the mounting points to which the detected sensor modules are attached based on predetermined configuration settings.

15. The method as claimed in claim 14, further comprising the mapping module translating the identification information into elevation and azimuth information for the sensor module's field of view, the elevation and azimuth information being used to stitch together the image data captured by the different sensor modules.

16. The method as claimed in claim 9, further comprising the base unit receiving new device identification information for each newly attached sensor module as the sensor module is newly attached to the base unit, and the mapping module determining a position of the newly attached sensor module based on a newly generated reference image depicting any previously identified sensor modules and the newly attached sensor module, wherein the new device identification information is associated with the position of the newly attached sensor module, with the process repeating for each subsequently attached sensor module.

17. A security camera system, comprising:
  a base unit including a plurality of mounting points;
  sensor modules for attaching to the base unit at the mounting points and generating image data; and
  a mapping module, which executes on a central processing unit of the base unit or of a computing device, for receiving reference images and determining positions of the sensor modules based on the reference images,
  wherein the reference images are based on captured images depicting an area surrounding the security camera system, the area including a plurality of points of reference, and the mapping module determines the positions of the sensor modules based on comparisons of the image data generated by the sensor modules to the reference images,
  the system further comprising a marker module, which executes on the central processing unit of the base unit or of the computing device, for generating the reference images, the reference images including markers designating points of reference depicted in the captured images depicting the area surrounding the security camera system, wherein:

the marker module generates the reference images based on source images captured via a camera of a mobile computing device, the source images being panoramic images depicting the area surrounding the security camera system, and the marker module detecting the points of reference depicted in the source images via object recognition and indicating the detected points of reference with the markers;

the different sensor modules attached to the base unit generate the image data depicting different portions of the area surrounding the security camera system based on particular fields of view of the different sensor modules, the image data for each sensor module depicting any points of reference visible to the sensor module; and the mapping module determines the positions of the sensor modules by matching the points of reference depicted in the reference images with the same points of reference depicted in the image data generated by the sensor modules in order to determine elevation and azimuth information for the different sensor modules.

18. The system as claimed in claim 17, wherein the points of reference include three or more visually identifiable objects placed in the area surrounding the security camera system.

19. The system as claimed in claim 17, wherein the markers include information about the points of reference including position information with respect to the reference image, location information including information about locations of the points of reference with respect to the security camera system, and/or identification information for distinguishing the different points of reference from each other.

20. A method for configuring a multi-sensor security camera system including a base unit with a plurality of mounting points and sensor modules for attaching to the base unit at the mounting points and generating image data, the method comprising:

a mapping module, which executes on a central processing unit of the base unit or of a computing device, receiving reference images and determining positions of the sensor modules based on the reference images;

generating the reference images based on captured images depicting an area surrounding the security camera system, the area including a plurality of points of reference;

a marker module, which executes on the central processing unit of the base unit or of the computing device, generating the reference images, the reference images including markers designating the points of reference depicted in the captured images depicting the area surrounding the security camera system;

the mapping module determining the positions of the sensor modules based on comparisons of the image data generated by the sensor modules to the reference images, wherein:

the marker module generates the reference images based on source images captured via a camera of a mobile computing device, the source images being panoramic images depicting the area surrounding the security camera system, and the marker module detecting the points of reference depicted in the source images via object recognition and indicating the detected points of reference with the markers;

the different sensor modules attached to the base unit generate the image data depicting different portions of the area surrounding the security camera system based on particular fields of view of the different sensor modules, the image data for each sensor module depicting any points of reference visible to the sensor module; and the mapping module determines the positions of the sensor modules by matching the points of reference depicted in the reference images with the same points of reference depicted in the image data generated by the sensor modules in order to determine elevation and azimuth information for the different sensor modules.

21. The method as claimed in claim 20, wherein the points of reference include three or more visually identifiable objects placed in the area surrounding the security camera system.

22. The method as claimed in claim 20, wherein the markers include information about the points of reference including position information with respect to the reference image, location information including information about locations of the points of reference with respect to the security camera system, and/or identification information for distinguishing the different points of reference from each other.

* * * * *